(12) United States Patent
Wang et al.

(10) Patent No.: US 9,141,203 B2
(45) Date of Patent: Sep. 22, 2015

(54) KEY FREE MOUSE DEVICE

(71) Applicant: Primax Electronics Ltd., Neihu, Taipei (TW)

(72) Inventors: Deng Wang, Taipei (TW); Qing-Lin Zeng, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 24 days.

(21) Appl. No.: 14/107,368

(22) Filed: Dec. 16, 2013

(65) Prior Publication Data

US 2015/0123904 A1  May 7, 2015

(30) Foreign Application Priority Data

Nov. 7, 2013  (CN) ...................... 2013 2 0703860 U (51) Int. Cl.
 *G06F 3/033* (2013.01)
 *G06F 3/0354* (2013.01)
(52) U.S. Cl.
 CPC .................................. *G06F 3/03543* (2013.01)
(58) Field of Classification Search
 CPC ............. G06F 3/033; G09G 5/08; G09G 5/00
 USPC ................................................. 345/163–166
 See application file for complete search history.

(56) References Cited

U.S. PATENT DOCUMENTS

| 7,233,318 | B1* | 6/2007 | Farag et al. | 345/163 |
| 2002/0140676 | A1* | 10/2002 | Kao | 345/163 |
| 2006/0038779 | A1* | 2/2006 | Li | 345/163 |
| 2006/0044270 | A1* | 3/2006 | Chen | 345/163 |
| 2006/0170655 | A1* | 8/2006 | Hou et al. | 345/163 |
| 2006/0181512 | A1* | 8/2006 | Wang et al. | 345/163 |
| 2009/0295726 | A1* | 12/2009 | Kimura | 345/163 |
| 2011/0141017 | A1* | 6/2011 | Ku | 345/163 |

* cited by examiner

*Primary Examiner* — Pegeman Karimi
(74) *Attorney, Agent, or Firm* — Kirton McConkie; Evan R. Witt (57) ABSTRACT

A mouse device includes an upper cover, an intermediate cover, a lower cover, a circuit board, and two switches. Two protrusion posts of the upper cover are respectively penetrated through two perforations of the intermediate cover. Two first pivotal parts of the upper cover are respectively connected with two second pivotal parts of the intermediate cover. The upper cover is fixedly connected to an annular sidewall of the lower cover. The circuit board and the two switches are disposed on the lower cover. When the upper cover is rotated relative to the intermediate cover through the two first pivotal parts and two second pivotal parts, one of the two switches is triggered by the corresponding protrusion post so as to generate a corresponding electronic signal. The use of the present mouse device can prevent from introducing foreign matters, reduce the depressing force and avoid erroneously triggering the switch.

16 Claims, 6 Drawing Sheets

KEY FREE MOUSE DEVICE

FIELD OF THE INVENTION

The present invention relates to a mouse device, and more particularly to a key-free mouse device.

BACKGROUND OF THE INVENTION

In the conventional computer system, a mouse device is widely used to control a cursor position or a page scrolling action of a display screen of the computer system. In the conventional mouse device, an upper cover is usually divided into a left button zone and a right button zone. When the left button zone or the right button zone is pressed down, a corresponding switch on a circuit board is triggered. However, since the upper cover of the conventional mouse device is divided into the left button zone and the right button zone, a seam is formed at a middle region of the upper cover. Under this circumstance, the integrity of the entire outer appearance of the mouse device is restricted and destroyed. In addition, the use of the conventional mouse device is limited. For most users, since the index finger and the middle finger are frequently placed on the left button zone and the right button zone, respectively, the design of the conventional mouse device is detrimental to the hand care of the user. Moreover, due to the above limitations, the conventional mouse device fails to provide a multi-touch function.

Figure 1:
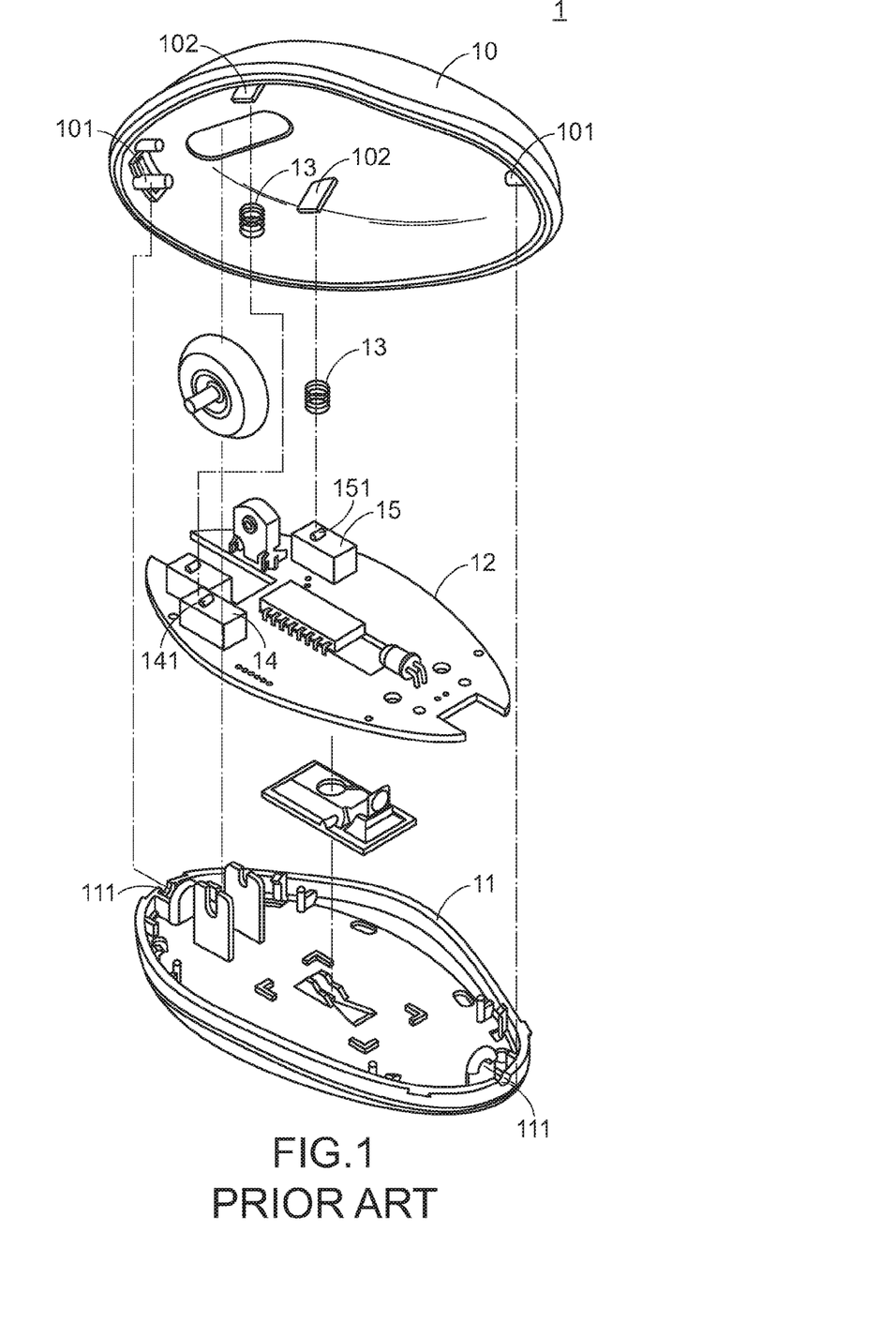
FIG. 1 is a schematic exploded view illustrating a conventional key-free mouse.

For solving the above drawbacks, a key-free mouse has been disclosed in U.S. Pat. No. 7,164,412 for example. Hereinafter, the structure of the key-free mouse will be illustrated with reference to FIG. 1. FIG. 1 is a schematic exploded view illustrating a conventional key-free mouse.

First of all, the components of the mouse device 1 will be illustrated. The mouse device 1 comprises an upper cover 10, a lower cover 11, and a circuit board 12. The upper cover 10 comprises two pivotal shafts 101 and two pressing parts 102. The two pivotal shafts 101 are located at a front side and a rear side of the upper cover 10, respectively. The two pressing parts 102 are located at a left side and a right side of the upper cover 10, respectively. The lower cover 11 comprises two fastening slots 111. The two fastening slots 111 are located at a front side and a rear side of the lower cover 11, respectively. Moreover, the mouse device 1 further comprises two springs 13, a first switch 14, and a second switch 15. The first switch 14 and the second switch 15 are disposed on a top surface of the circuit board 12. The two springs 13 are disposed on the first switch 14 and the second switch 15, respectively.

For assembling the mouse device 1, the circuit board 12 is firstly disposed on the lower cover 11. The upper cover 10 is connected with the lower cover 11 from the top side of the circuit board 12. Moreover, the two pivotal shafts 101 are inserted into the two fastening slots 111, respectively. Consequently, the upper cover 10 is rotatable relative to the lower cover 11. In addition, after the upper cover 10 is connected with the lower cover 11, the first switch 14 and the second switch 15 are disposed under the two pressing parts 102, respectively. Moreover, the two pressing parts 102 are connected with the two springs 13, respectively.

When a left side of the upper cover 10 of the mouse device 1 (i.e. the left side of the right-handed user who operates the mouse device 1) or a right side of the upper cover 10 of the mouse device 1 (i.e. the right side of the right-handed user who operates the mouse device 1) is depressed by the user, the upper cover 10 is rotated relative to the lower cover 11. As the upper cover 10 is rotated relative to the lower cover 11, a corresponding pressing part 102 of the two pressing parts 102 is moved downwardly to push a contact part 141 of the first switch 14 or a contact part 151 of the second switch 15. Consequently, a corresponding command is executed by the computer.

When the left side or the right side of the upper cover 10 of the mouse device 1 is no longer depressed by the user, in response to the restoring forces of the two springs 13, the upper cover 10 is returned to its original position where the upper cover 10 has not been depressed.

From the above discussions about the conventional key-free mouse device 1, the upper cover 10 is rotatable relative to the lower cover 11 by means of the two pivotal shafts 101 and the two fastening slots 111. Consequently, the first switch 14 or the second switch 15 on the circuit board 12 is correspondingly triggered.

However, the conventional key-free mouse device 1 still has some drawbacks. For example, after the upper cover 10 and the lower cover 11 are combined together, the upper cover 10 and the lower cover 11 are not completely sealed. Moreover, the circuit board 12 is disposed on the lower cover 11. When the upper cover 10 is rotated in a direction toward the left side or the right side and tilted, a vacant space between the upper cover 10 and the lower cover 11 is possibly too large. Consequently, the dust or other foreign matters may be introduced into the conventional key-free mouse device 1 through the vacant space. Under this circumstance, the circuit board 12 of the mouse device 1 and the electronic components on the circuit board 12 are possibly suffered from damage or malfunction, and the use life of the mouse device 1 is shortened.

Moreover, since the two springs 13 are respectively disposed on the first switch 14 and the second switch 15, the user's fingers have to be placed on the upper cover 10 at the positions corresponding to the first switch 14 and the second switch 15. In addition, the forces exerted on the first switch 14 and the second switch 15 should be large enough in order to trigger the first switch 14 and the second switch 15. Under this circumstance, the tactile feel is strengthened. As known, the strengthened tactile feel is detrimental to hand care.

Moreover, the user usually holds the sidewall of the mouse device in order to move the mouse device or perform any other appropriate operation. Since the sidewall of the mouse device 1 is extended from the upper cover 10, the user fails to stably hold the sidewall of the mouse device 1 during operation of the mouse device 1. Moreover, during the process of moving the mouse device 1, the upper cover 10 is possibly pushed by the user. Under this circumstance, the first switch 14 or the second switch 15 may be erroneously triggered.

Therefore, there is a need of providing an improved key-free mouse device in order to eliminate the above drawbacks of the conventional key-free mouse device.

SUMMARY OF THE INVENTION

An object of the present invention provides a key-free mouse device for preventing from introducing foreign matters.

Another object of the present invention provides a key-free mouse device for reducing the force exerted on an upper cover thereof.

A further object of the present invention provides a key-free mouse device for avoiding erroneously triggering the switch during movement of the mouse device.

In accordance with an aspect of the present invention, there is provided a mouse device. The mouse device includes an upper cover, an intermediate cover, a lower cover, a circuit board, and two switches. The upper cover includes two protrusion posts and two first pivotal parts. The two protrusion posts and the two first pivotal parts are disposed on an inner surface of the upper cover. The intermediate cover is disposed under the upper cover, and includes two perforations and two second pivotal parts. The two protrusion posts are respectively penetrated through the two perforations. The two second pivotal parts are respectively connected with the two first pivotal parts, so that the upper cover is rotatable relative to the intermediate cover. The lower cover is disposed under the intermediate cover, and connected with the intermediate cover. The circuit board is disposed over the lower cover, and arranged between the intermediate cover and the lower cover. The two switches are disposed on the circuit board. When the upper cover is rotated relative to the intermediate cover in a first direction or a second direction, the corresponding switch is triggered by the corresponding protrusion post so as to generate a corresponding electronic signal.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
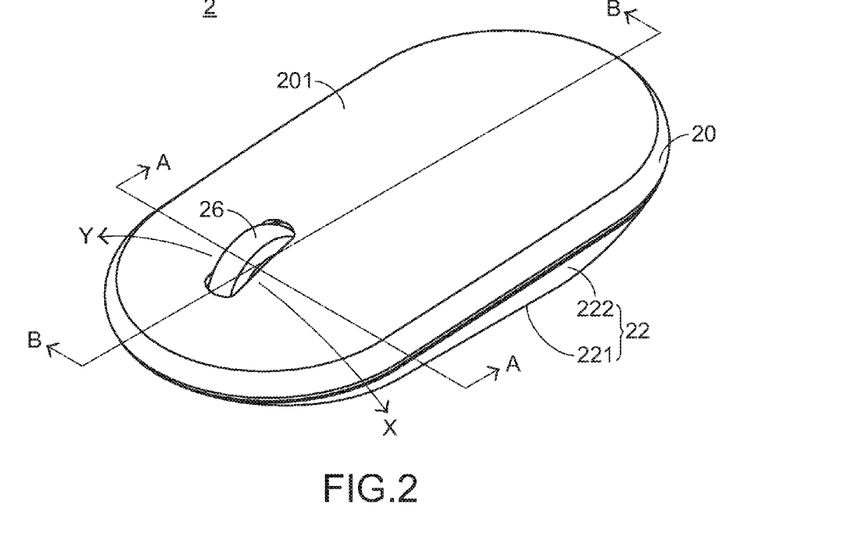
FIG. 2 is a schematic perspective view illustrating the outer appearance of a mouse device according to an embodiment of the present invention.
Figure 3:
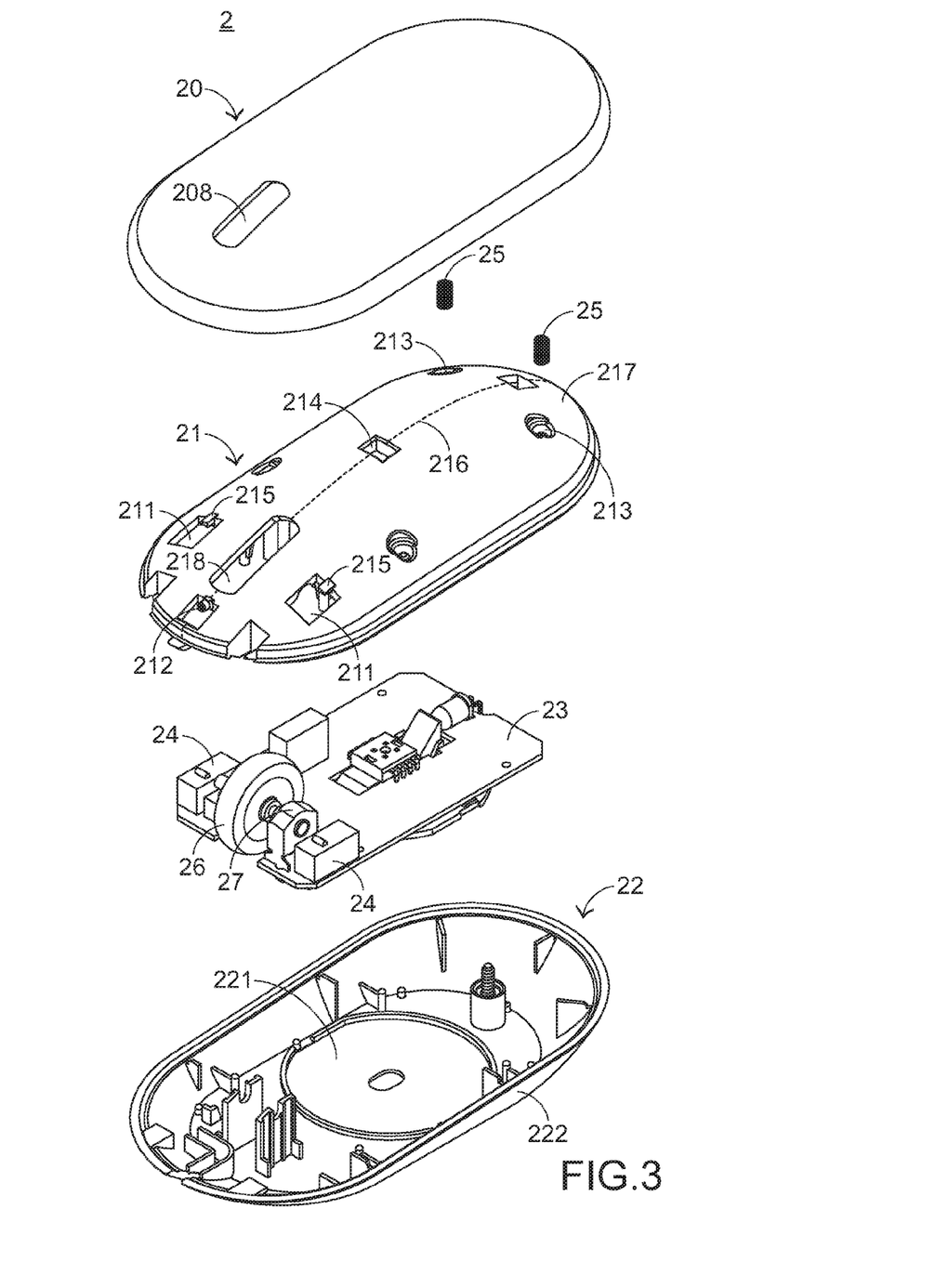
FIG. 3 is a schematic exploded view illustrating the mouse device according to the first embodiment of the present invention.

Hereinafter, a key-free mouse device 2 according to an embodiment of the present invention will be illustrated with reference to FIGS. 2 and 3. FIG. 2 is a schematic perspective view illustrating the outer appearance of a mouse device according to an embodiment of the present invention. FIG. 3 is a schematic exploded view illustrating the mouse device according to the first embodiment of the present invention.

Hereinafter, the components of the mouse device 2 of this embodiment will be illustrated. The mouse device 2 comprises an upper cover 20, an intermediate cover 21, a lower cover 22, a circuit board 23, two switches 24, two elastic elements 25, and a scroll wheel 26. The lower cover 22 comprises a base plate 221 and an annular sidewall 222. The annular sidewall 222 is extended upwardly from a periphery of the base plate 221.

In this embodiment, the user may move the mouse device 2 by holding the annular sidewall 222 of the lower cover 22. When a top surface 201 of the upper cover 20 of the mouse device 2 is pressed down, the upper cover 20 is rotatable relative to the intermediate cover 21 in a direction toward a left side or a right side. Consequently, a corresponding one of the two switches 24 within the mouse device 2 is triggered. The operations of the mouse device 2 will be illustrated later.

Figure 4:
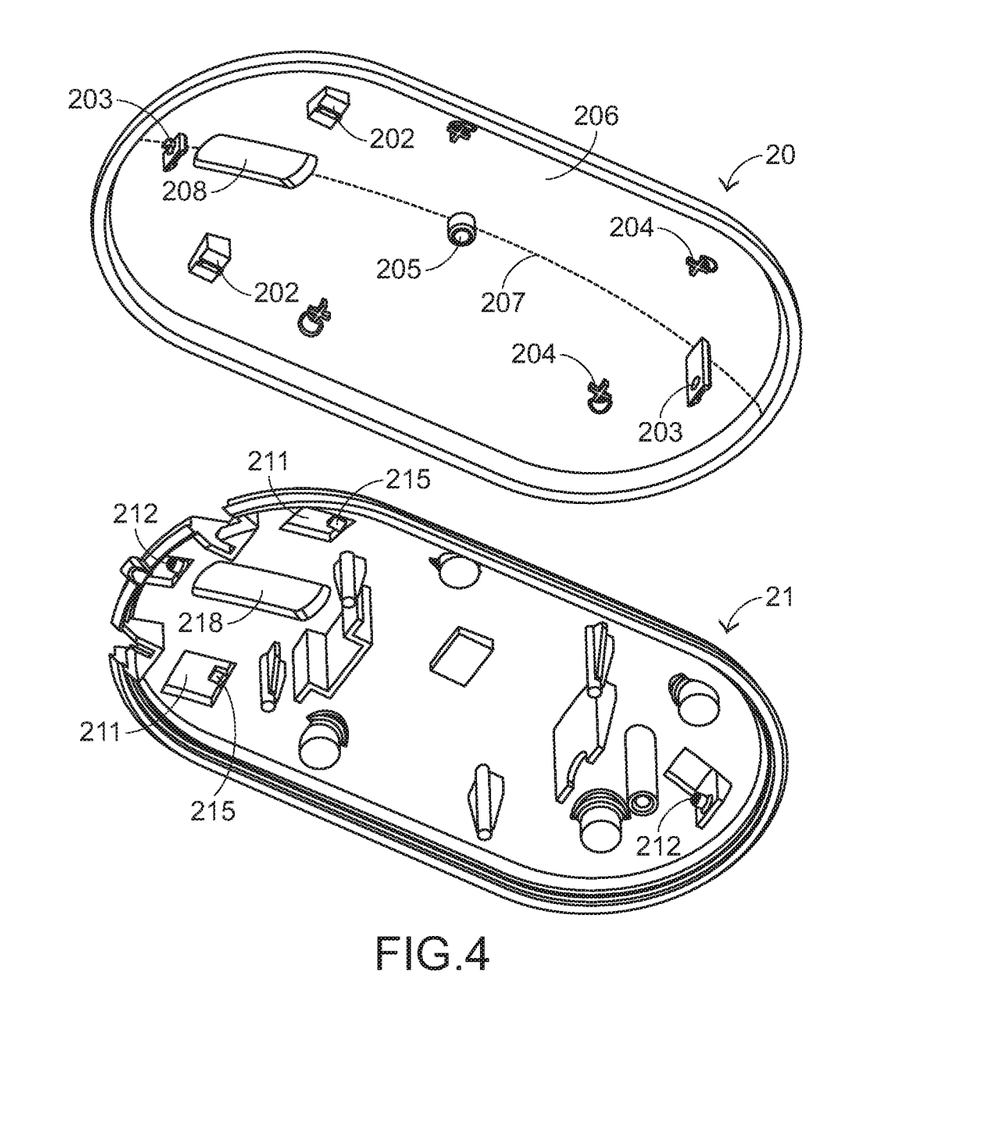
FIG. 4 is a schematic exploded view illustrating the upper cover and the intermediate cover of the mouse device according to the embodiment of the present invention.
Figure 5:
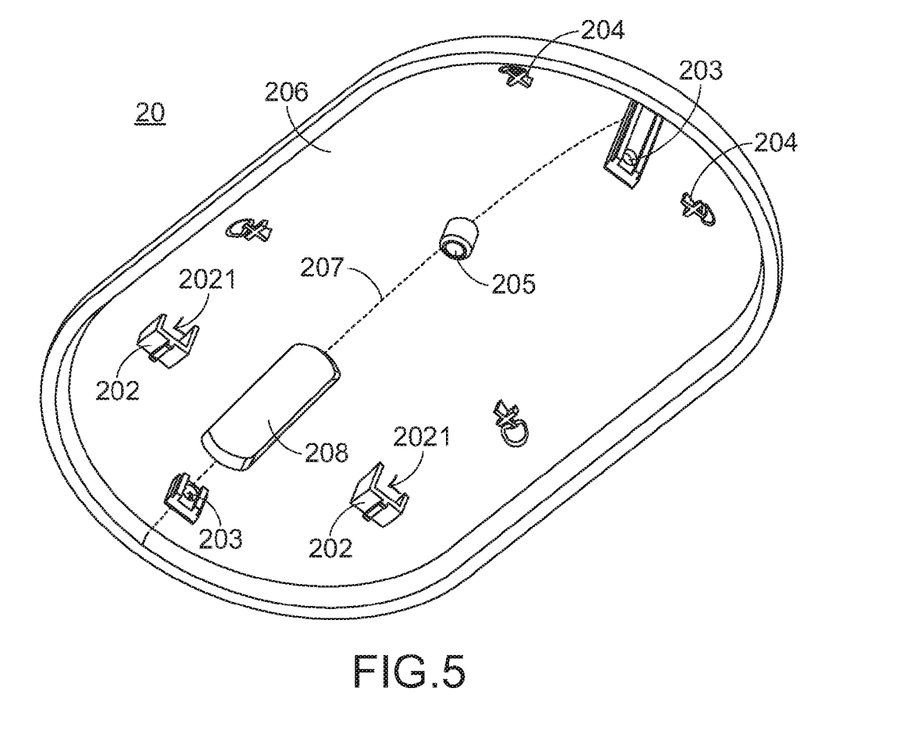
FIG. 5 is a schematic perspective view illustrating the upper cover of the mouse device according to the embodiment of the present invention.

Hereinafter, the detailed structures of the upper cover 20 and the intermediate cover 21 will be illustrated with reference to FIGS. 3, 4 and 5. FIG. 4 is a schematic exploded view illustrating the upper cover and the intermediate cover of the mouse device according to the embodiment of the present invention. FIG. 5 is a schematic perspective view illustrating the upper cover of the mouse device according to the embodiment of the present invention.

First of all, the upper cover 20 comprises two protrusion posts 202, two first pivotal parts 203, two bulges 204, and a positioning block 205, which are disposed on an inner surface 206 of the upper cover 20. Each of the two protrusion posts 202 comprises an engaging recess 2021. The engaging recess 2021 is formed in a lateral surface of the corresponding protrusion post 202. Moreover, the upper cover 20 further comprises a second slot 208. The second slot 208 is arranged between the two protrusion posts 202.

The two protrusion posts 202 are symmetrical with respect to a central line 207 of the upper cover 20. That is, the two protrusion posts 202 are symmetrically located at a left side and a right side of the central line 207 of the upper cover 20 (i.e. the left side and the right side of the right-handed user who operates the mouse device 2). Moreover, the two protrusion posts 202 are located near a front side of the upper cover 20 (i.e. the front side of the right-handed user who operates the mouse device 2).

The two first pivotal parts 203 are located at a front side and a rear side of the central line 207 of the upper cover 20 (i.e. the front side and the rear side of the right-handed user who operates the mouse device 2). In this embodiment, the first pivotal part 203 is a pivotal hole, but is not limited thereto. Alternatively, in some other embodiments, the first pivotal part 203 is a rotating shaft. In addition, the positioning block 205 is arranged between the two first pivotal parts 203, and located near a middle region of the central line 207.

Furthermore, the intermediate cover 21 comprises two perforations 211, two second pivotal parts 212, two indentations 213, a positioning recess 214, two engaging blocks 215, and a first slot 218.

The two perforations 211 are symmetrical with respect to a central line 216 of the intermediate cover 21. That is, the two perforations 211 are symmetrically located at a left side and a right side of the central line 216 of the intermediate cover 21 (i.e. the left side and the right side of the right-handed user who operates the mouse device 2). Moreover, the two perforations 211 are located near a front side of the intermediate cover 21 (i.e. the front side of the right-handed user who operates the mouse device 2).

The two second pivotal parts 212 are located at a front side and a rear side of the central line 216 of the intermediate cover 21 (i.e. the front side and the rear side of the right-handed user who operates the mouse device 2). The two second pivotal parts 212 match the two first pivotal parts 203. In this embodiment, the first pivotal part 203 is a pivotal hole, and thus the second pivotal part 212 is a rotating shaft. Alternatively, in case that the first pivotal part 203 is a rotating shaft, and thus the second pivotal part 212 is a pivotal hole.

Moreover, the two indentations 213 are arranged between the two perforations 211 and a rear end 217 of the intermediate cover 21. In addition, the two indentations 213 are symmetrically located at the left side and the right side of the central line 216 of the intermediate cover 21. It is noted that the two indentations 213 may be located at arbitrary positions between the two perforations 211 and the rear end 217 of the intermediate cover 21. The positions of the two indentations 213 as shown in the drawings are presented herein for purpose of illustration and description only.

The positioning recess 214 is arranged between the two second pivotal parts 212, and located near a middle region of the central line 216. The two engaging blocks 215 are extended from the peripheries of the two perforations 211 and protruded over the two perforations 211, respectively. The first slot 218 is arranged between the two perforations 211.

Figure 6:
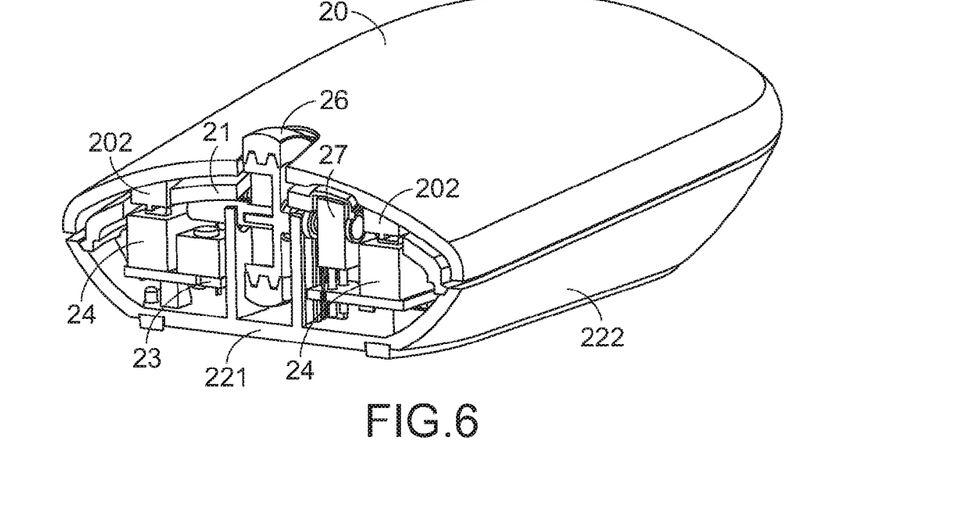
FIG. 6 is a schematic cutaway view illustrating the mouse device of FIG. 2 and taken along the line A-A.
Figure 7:
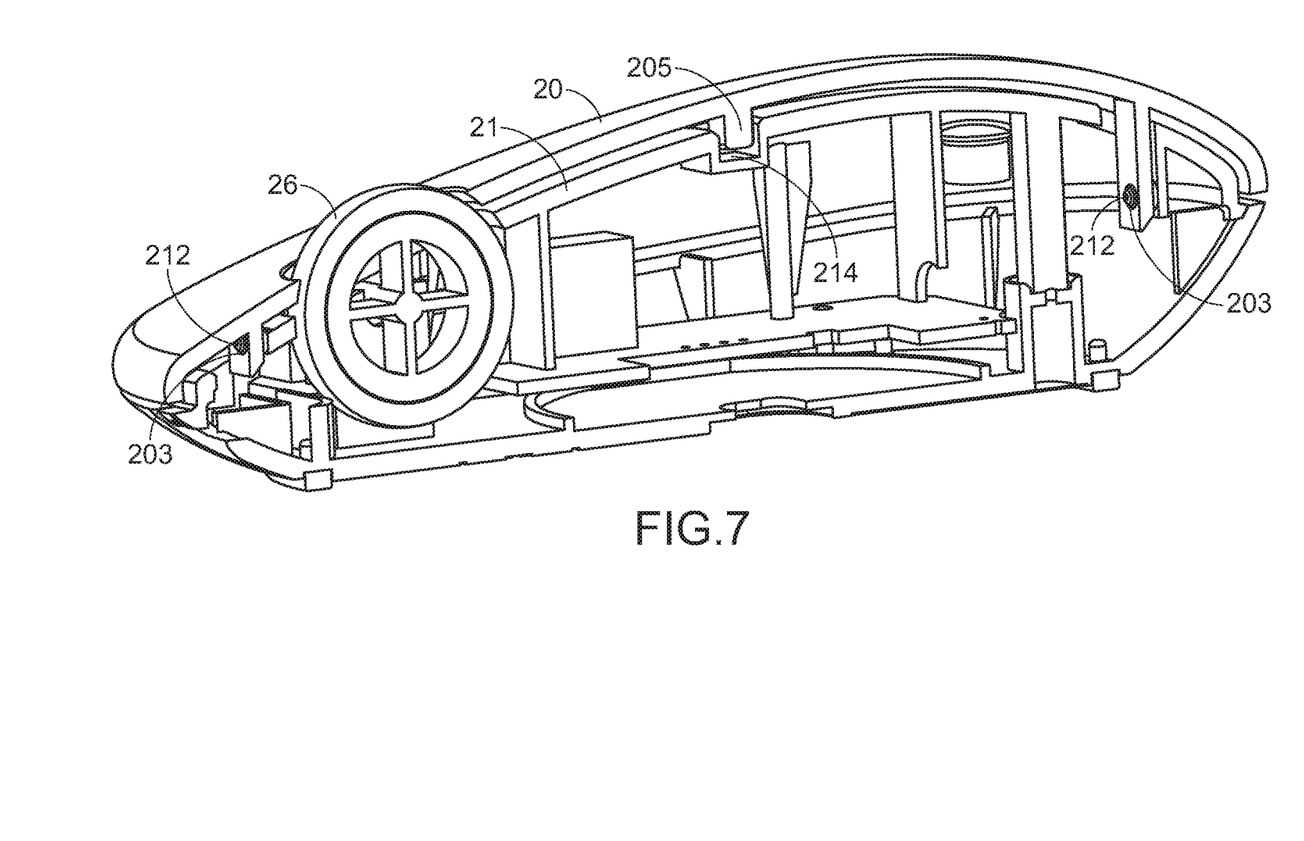
FIG. 7 is a schematic cutaway view illustrating the mouse device of FIG. 2 and taken along the line B-B.

Hereinafter, a sequence of assembling the mouse device 2 will be illustrated with reference to FIGS. 3-7. FIG. 6 is a schematic cutaway view illustrating the mouse device of FIG. 2 and taken along the line A-A. FIG. 7 is a schematic cutaway view illustrating the mouse device of FIG. 2 and taken along the line B-B.

Firstly, the circuit board 23 is disposed on the lower cover 22. The two switches 24 are disposed on the circuit board 23. In addition, the two switches 24 are located near a front side of the lower cover 22 (i.e. the front side of the right-handed user who operates the mouse device 2). The scroll wheel 26 is arranged between the two switches 24. For detecting a rotation amount of the scroll wheel 26, the mouse device 2 further comprises a rotation encoder 27. The rotation encoder 27 is disposed on the circuit board 23. The scroll wheel 26 is penetrated through the rotation encoder 27.

Then, the intermediate cover 21 is fixedly connected to the annular sidewall 222 of the lower cover 22 from the top side of the lower cover 22. Then, the circuit board 23 is accommodated within the space between the intermediate cover 21 and the lower cover 22. After the intermediate cover 21 is fixedly connected to the annular sidewall 222 of the lower cover 22, the two perforations 211 are aligned with the two switches 24, respectively.

Then, the two elastic elements 25 are disposed within the two indentations 213, and partially protruded over the two indentations 213, respectively. Then, the upper cover 20 is disposed over the intermediate cover 21. In addition, the two first pivotal parts 203 of the upper cover 20 are connected with the two second pivotal parts 212 of the intermediate cover 21, respectively. In this embodiment, the two rotating shafts of the intermediate cover 21 are locked into the two pivotal holes of the upper cover 20, respectively. Consequently, the upper cover 20 is rotatable relative to the intermediate cover 21 by using the two first pivotal parts 203 as fulcrums.

After the upper cover 20 is pivotally coupled to the intermediate cover 21, the two protrusion posts 202 are penetrated through the two perforations 211 of the intermediate cover 21 and disposed over the two switches 24, respectively. At the same time, the two bulges 204 are coupled with the two elastic elements 25, respectively. Consequently, the two elastic elements 25 are fixed within the space between the upper cover 20 and the intermediate cover 21. Moreover, the scroll wheel 26 is partially penetrated through the first slot 218 and the second slot 208 and exposed outside the upper cover 20.

In case that the movable range of the upper cover 20 relative to the intermediate cover 21 in the direction toward a front side or a rear side (i.e. the front side or the rear side of the right-handed user who operates the mouse device 2) is too large, the possibility of causing detachment of the two first pivotal parts 203 from the two second pivotal parts 212 will increase. In this embodiment, for presenting detachment of the two first pivotal parts 203 from the two second pivotal parts 212, the positioning block 205 of the upper cover 20 is locked into the positioning recess 214 of the intermediate cover 21. Since the positioning block 205 is restricted by the profile of the positioning recess 214, the positioning block 205 fails to be moved within the positioning recess 214 to a larger extent in the direction toward the front side or the rear side. Consequently, the upper cover 20 is not detached from the intermediate cover 21.

In case that the movable range of the upper cover 20 relative to the intermediate cover 21 in an upward direction or a downward direction is too large, the possibility of causing detachment of the two first pivotal parts 203 from the two second pivotal parts 212 will increase. In this embodiment, when the two protrusion posts 202 of the upper cover 20 are penetrated through the two perforations 211 of the intermediate cover 21, the two engaging blocks 215 of the intermediate cover 21 are locked into the two engaging recesses 2021 of the two protrusion posts 202, respectively. Since the movable range of the two engaging recesses 2021 relative to the two engaging blocks 215 in the upward direction or the downward direction is restricted to a small extent, the possibility of causing detachment of the upper cover 20 from the intermediate cover 21 is minimized or eliminated.

By the way, if the shapes of the two first pivotal parts 203 match the shapes of the two second pivotal parts 212, the movable range of the upper cover 20 relative to the intermediate cover 21 in the upward direction or the downward direction can be restricted to a small extent. Consequently, the possibility of causing detachment of the upper cover 20 from the intermediate cover 21 is minimized or eliminated. Under this circumstance, the two engaging blocks 215 and the two engaging recesses 2021 are not essential structures. In other words, the two engaging blocks 215 and the two engaging recesses 2021 may be omitted.

Hereinafter, the operating principles of the mouse device 2 of this embodiment will be illustrated with reference to FIGS. 2, 6 and 7.

For operating the mouse device 2, the user may hold the annular sidewall 222 of the lower cover 22 to move the mouse device 2 and the user may rotate the scroll wheel 26 to execute a page scrolling action. For executing a left mouse button function (e.g. a character selecting function), the user may depress the left side of the top surface 201 of the upper cover 20 of the mouse device 2, so that the upper cover 20 is rotated relative to the intermediate cover 21 in a first direction X. Under this circumstance, the protrusion post 202 at the left side of the upper cover 20 may trigger the underlying switch 24 to generate a corresponding electronic signal.

At the same time, the elastic element 25 at the left side of the intermediate cover 21 is compressed by the left side of the upper cover 20 and thus subject to deformation. Moreover, when the left side of the upper cover 20 is no longer depressed by the user, in response to a restoring force of the elastic element 25, the upper cover 20 is returned to its original position where the upper cover 20 has not been depressed.

For executing a right mouse button function (e.g. a menu opening function), the user may depress the right side of the top surface 201 of the upper cover 20 of the mouse device 2, so that the upper cover 20 is rotated relative to the intermediate cover 21 in a second direction Y. Under this circumstance, the protrusion post 202 at the right side of the upper cover 20 may trigger the underlying switch 24 to generate a corresponding electronic signal.

At the same time, the elastic element 25 at the right side of the intermediate cover 21 is compressed by the right side of the upper cover 20 and thus subject to deformation. Moreover, when the right side of the upper cover 20 is no longer depressed by the user, in response to a restoring force of the elastic element 25, the upper cover 20 is returned to its original position where the upper cover 20 has not been depressed.

From the above descriptions, the circuit board 23 is disposed on the lower cover 22, the intermediate cover 21 is fixedly connected to the annular sidewall 222 of the lower cover 22, and the upper cover 20 is pivotally coupled to the intermediate cover 21. Consequently, when the upper cover 20 is rotated relative to the intermediate cover 21 in a direction toward the left side or the right side and tilted, the intermediate cover 21 is not moved relative to the lower cover 22. Under this circumstance, there is no vacant space between the intermediate cover 21 and the lower cover 22. Since the problem of introducing the dust or other foreign matters into the mouse device 2 is solved, the possibility of causing damage or malfunction of the electronic components on the circuit board 23 will be minimized and the use life of the mouse device 2 will be prolonged.

Moreover, the elastic elements 25 are arranged between the two perforations 211 of the intermediate cover 21 and the rear end 217 of the intermediate cover 21. Consequently, the elastic elements 25 are far away from the positions of the two switches 24. Under this circumstance, for triggering each of the two switches 24, it is not necessary to apply a large force. Moreover, it is not always necessary to depress the upper cover 20 with the user's fingers. Especially, the upper cover 20 may be depressed with the use's palm. Since the tactile feel of depressing the upper cover 20 is alleviated, the efficacy of the hard care is enhanced.

Moreover, since the upper cover 20 and the annular sidewall 222 of the lower cover 22 are not connected with each other, the user may naturally hold the annular sidewall 222 of the lower cover 22 with the thumb, the ring finger and the little finger in order to move the mouse device 2 or perform any other appropriate operation. Consequently, during the process of moving the mouse device 2, the possibility of pushing the upper cover 20 to erroneously trigger the two switches 24 will be minimized or eliminated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising:
    an upper cover comprising two protrusion posts and two first pivotal parts, wherein the two protrusion posts and the two first pivotal parts are disposed on an inner surface of the upper cover;
    an intermediate cover disposed under the upper cover, and comprising two perforations and two second pivotal parts, wherein the two protrusion posts are respectively penetrated through the two perforations, wherein the two second pivotal parts are respectively connected with the two first pivotal parts, so that the upper cover is rotatable relative to the intermediate cover;
    two elastic elements arranged between the intermediate cover and the upper cover for returning the upper cover to an original position, wherein the two elastic elements are arranged between the two perforations and a rear end of the intermediate cover;
    a lower cover disposed under the intermediate cover, and connected with the intermediate cover;
    a circuit board disposed over the lower cover, and arranged between the intermediate cover and the lower cover; and
    two switches disposed on the circuit board,
    wherein when the upper cover is rotated relative to the intermediate cover in a first direction or a second direction, the corresponding switch is triggered by the corresponding protrusion post so as to generate a corresponding electronic signal.

2. The mouse device according to claim 1, wherein the upper cover further comprises two bulges, and the intermediate cover further comprises two indentations, wherein the two elastic elements are disposed within the two indentations and coupled with the two bulges, respectively.

3. The mouse device according to claim 1, wherein the two protrusion posts are located at a left side and a right side of the upper cover, the two first pivotal parts are located at a front side and a rear side of the upper cover, the two perforations are located at a left side and a right side of the intermediate cover, and the two second pivotal parts are located at a front side and a rear side of the intermediate cover.

4. The mouse device according to claim 1, wherein the first pivotal part is a rotating shaft, and the second pivotal part is a pivotal hole.

5. The mouse device according to claim 1, wherein the first pivotal part is a pivotal hole, and the second pivotal part is a rotating shaft.

6. The mouse device according to claim 1, wherein the upper cover further comprises a positioning block, and the positioning block is arranged between the two first pivotal parts, wherein the intermediate cover further comprises a positioning recess, and the positioning recess is arranged between the two second pivotal parts, wherein the positioning block is locked into the positioning recess, thereby preventing detachment of the upper cover from the intermediate cover.

7. The mouse device according to claim 1, wherein two engaging recesses are formed in lateral surfaces of the two protrusion posts, respectively, wherein the intermediate cover further comprises two engaging blocks, and the two engaging blocks are extended from the peripheries of respective perforations, wherein the two engaging blocks are respectively locked into the two engaging recesses, thereby preventing detachment of the upper cover from the intermediate cover.

8. The mouse device according to claim 1, wherein the mouse device further comprises a scroll wheel, and the scroll wheel is arranged between the two switches, wherein the intermediate cover further comprises a first slot, and the first slot is arranged between the two perforations, wherein the upper cover further comprises a second slot, and the second slot is arranged between the two protrusion posts, wherein after the scroll wheel is penetrated through the first slot and the second slot, the scroll wheel is partially exposed outside the upper cover.

9. The mouse device according to claim 1, wherein the lower cover comprises a base plate and an annular sidewall, wherein the annular sidewall is extended upwardly from a periphery of the base plate, wherein the intermediate cover is connected to the annular sidewall.

10. A mouse device, comprising:
    an upper cover comprising two protrusion posts and two first pivotal parts, wherein the two protrusion posts and the two first pivotal parts are disposed on an inner surface of the upper cover;
    an intermediate cover disposed under the upper cover, and comprising two perforations and two second pivotal parts, wherein the two protrusion posts are respectively penetrated through the two perforations, wherein the two second pivotal parts are respectively connected with the two first pivotal parts, so that the upper cover is rotatable relative to the intermediate cover;
    a lower cover disposed under the intermediate cover, and connected with the intermediate cover;

a circuit board disposed over the lower cover, and arranged between the intermediate cover and the lower cover; and two switches disposed on the circuit board, wherein when the upper cover is rotated relative to the intermediate cover in a first direction or a second direction, the corresponding switch is triggered by the corresponding protrusion post so as to generate a corresponding electronic signal, wherein two engaging recesses are formed in lateral surfaces of the two protrusion posts, respectively, wherein the intermediate cover further comprises two engaging blocks, and the two engaging blocks are extended from the peripheries of respective perforations, wherein the two engaging blocks are respectively locked into the two engaging recesses, thereby preventing detachment of the upper cover from the intermediate cover.

11. The mouse device according to claim 10, wherein the two protrusion posts are located at a left side and a right side of the upper cover, the two first pivotal parts are located at a front side and a rear side of the upper cover, the two perforations are located at a left side and a right side of the intermediate cover, and the two second pivotal parts are located at a front side and a rear side of the intermediate cover.

12. The mouse device according to claim 10, wherein the first pivotal part is a rotating shaft, and the second pivotal part is a pivotal hole.

13. The mouse device according to claim 10, wherein the first pivotal part is a pivotal hole, and the second pivotal part is a rotating shaft.

14. The mouse device according to claim 10, wherein the upper cover further comprises a positioning block, and the positioning block is arranged between the two first pivotal parts, wherein the intermediate cover further comprises a positioning recess, and the positioning recess is arranged between the two second pivotal parts, wherein the positioning block is locked into the positioning recess, thereby preventing detachment of the upper cover from the intermediate cover.

15. The mouse device according to claim 10, wherein the mouse device further comprises a scroll wheel, and the scroll wheel is arranged between the two switches, wherein the intermediate cover further comprises a first slot, and the first slot is arranged between the two perforations, wherein the upper cover further comprises a second slot, and the second slot is arranged between the two protrusion posts, wherein after the scroll wheel is penetrated through the first slot and the second slot, the scroll wheel is partially exposed outside the upper cover.

16. The mouse device according to claim 10, wherein the lower cover comprises a base plate and an annular sidewall, wherein the annular sidewall is extended upwardly from a periphery of the base plate, wherein the intermediate cover is connected to the annular sidewall.

* * * * *